Aug. 16, 1927.
E. C. WILEY
1,638,900
DIRECT RETURN TRAP
Filed Aug. 21, 1925  3 Sheets-Sheet 1
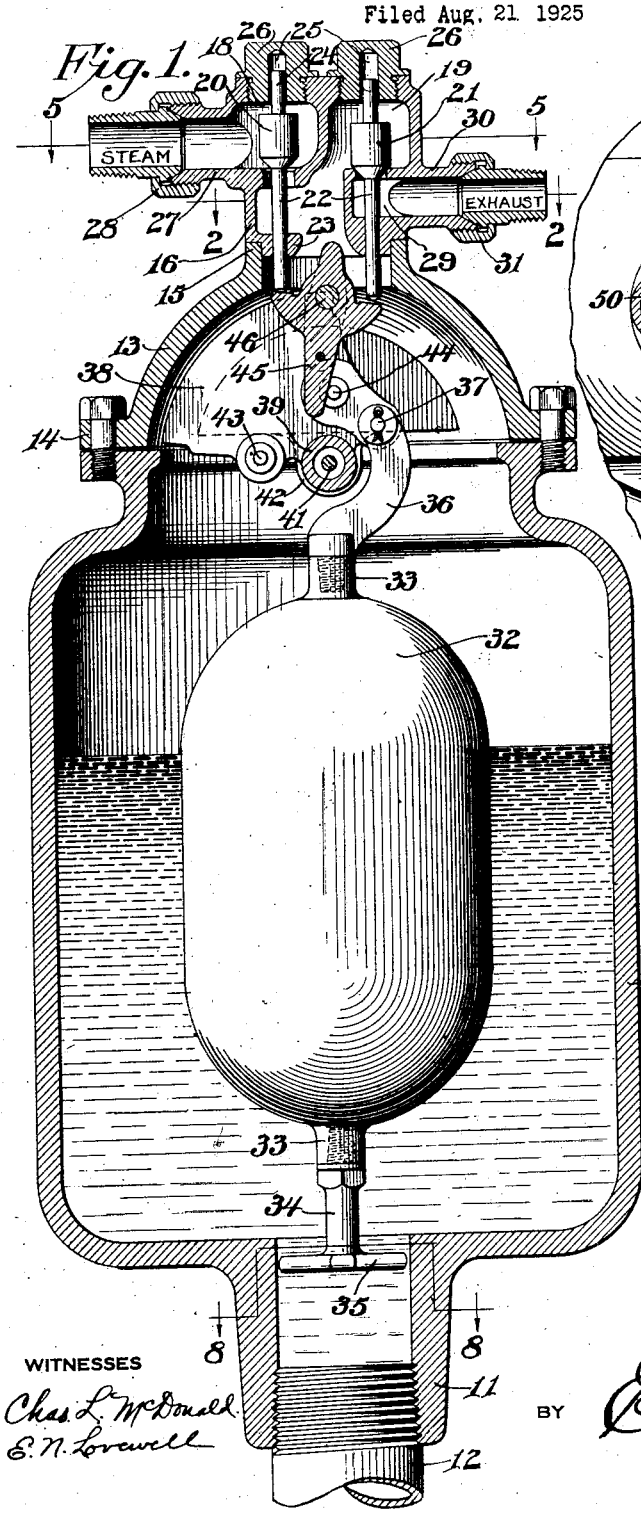
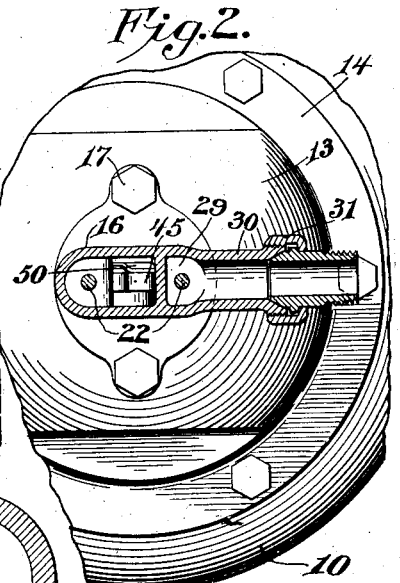
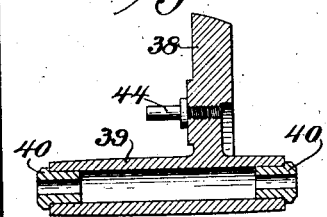
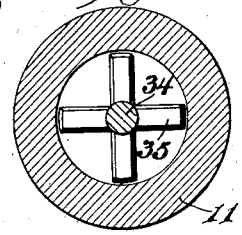
WITNESSES
INVENTOR
Edgar C. Wiley
BY
ATTORNEY Aug. 16, 1927. 1,638,900
E. C. WILEY
DIRECT RETURN TRAP
Filed Aug. 21, 1925    3 Sheets-Sheet 2
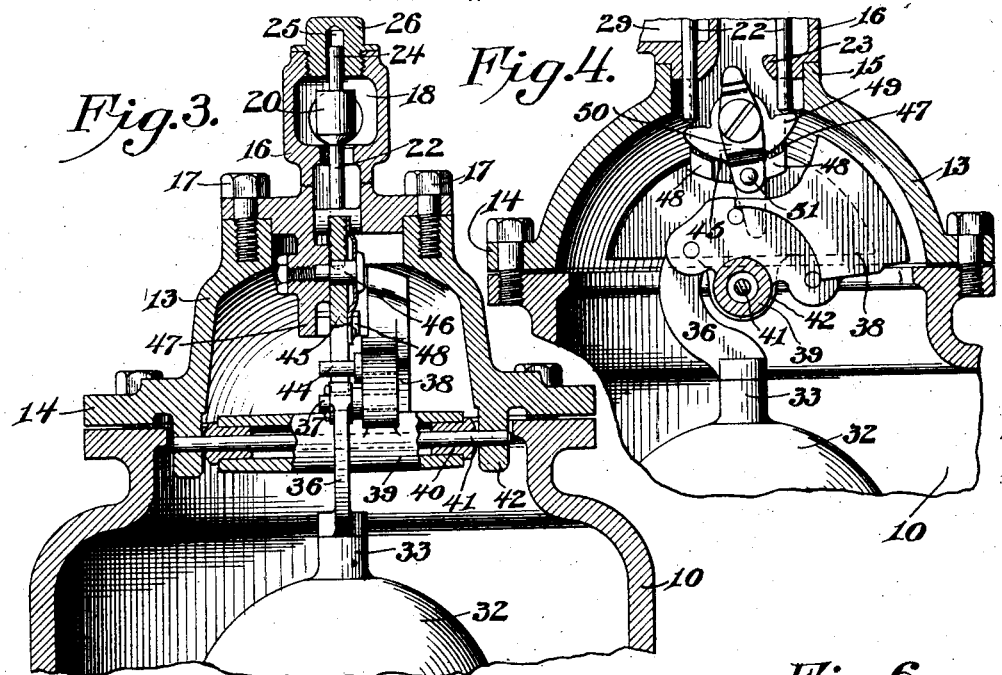
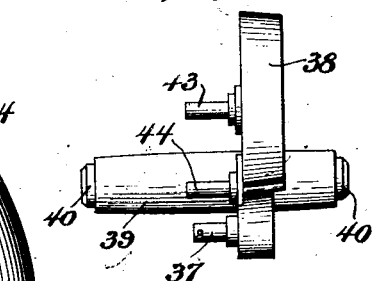
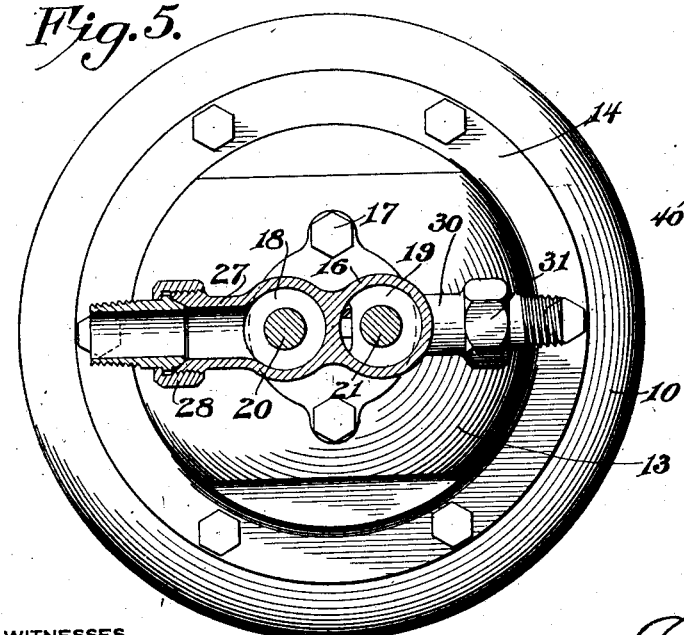
WITNESSES
Chas. L. McDonald
E. N. Lovewell
INVENTOR
Edgar C. Wiley
BY
E. G. Siggers
ATTORNEY

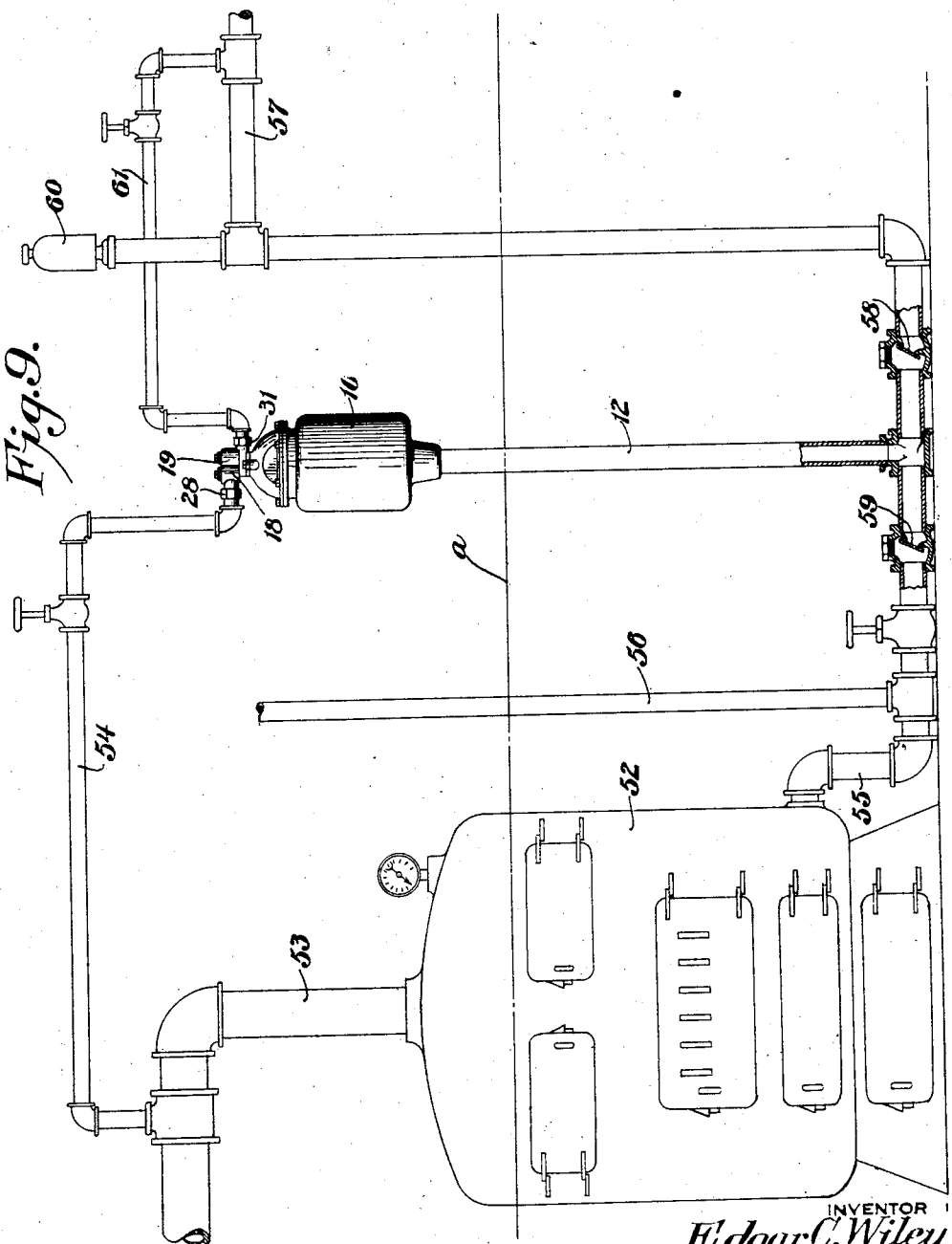

Patented Aug. 16, 1927.

1,638,900

UNITED STATES PATENT OFFICE.

EDGAR C. WILEY, OF LYNCHBURG, VIRGINIA, ASSIGNOR TO SIMPLEX HEATING SPECIALTY COMPANY INC., OF LYNCHBURG, VIRGINIA, A CORPORATION OF VIRGINIA.

DIRECT-RETURN TRAP.

Application filed August 21, 1925. Serial No. 51,709.

This invention relates to a direct return trap adapted to be used in steam or vapor heating systems for facilitating the return of the water of condensation to the boiler.

According to the preferred method of installing steam or vapor heating systems, a return pipe line is provided for the water of condensation, and is maintained substantially at atmospheric pressure, while back pressure from the boiler to the return pipe line is prevented by means of check valves. A trap having an exhaust port normally open receives the water of condensation as it flows back toward the boiler. Whenever the water within the trap reaches a predetermined level communication is temporarily established between the trap and the steam pressure line, while the exhaust port is closed, and the contents of the trap flow back into the boiler.

The general object of the present invention is to provide improved mechanism for controlling the operation of the trap, which is simple in its construction and easily accessible, and in which, at the proper time, the shifting of the valves is quickly and positively effected.

The invention comprises an improved arrangement of the valves and valve housings, improved means for actuating the valves, and improvements in the construction of the float and the means for connecting it to the actuating mechanism for controlling the latter.

The detailed construction of the invention and its advantages will be more specifically explained in connection with the accompanying drawings, which illustrate one embodiment thereof.

In the drawings:

Figure 1 is a central vertical section through the trap and the mechanism associated therewith.

Figure 2 is a horizontal section taken on the line 2—2 of Figure 1.

Figure 3 is a vertical section taken at right angles to the plane of Figure 1.

Figure 4 is a vertical section on a plane parallel to that of Figure 1, but looking in the opposite direction.

Figure 5 is a horizontal section taken on the line 5—5 of Figure 1.

Figure 6 is a detail view in elevation of the weight constituting a part of the valve controlling mechanism.

Figure 7 is a sectional view of the weight.

Figure 8 is a horizontal section taken on the line 8—8 of Figure 1.

Figure 9 shows the trap as it is installed in a heating system.

Referring in detail to the drawings, the trap comprises a condensation receiver 10, the body portion of which is preferably cylindrical, and is formed at its lower end with an internally threaded collar 11 constituting an inlet, and adapted to be connected, in the usual manner, by a pipe 12 to the return pipe line which leads from the radiators back to the boiler. The receiver 10 has a dome 13 secured to its upper end, preferably by a flange coupling 14. The dome is formed at its top with an opening surrounded by an annular seat 15, on which a valve cage 16 is secured by suitable bolts 17 or the like.

The valve cage 16 is formed with two chambers 18 and 19 in which are mounted the steam and exhaust valves 20 and 21, respectively. These valves are mounted for vertical reciprocation, and each has a downwardly projecting stem 22 guided in an opening in a flange 23, projecting inwardly from the wall of the valve cage at the lower end thereof. Each valve has also an upwardly projecting stem 24 guided in a bore 25, formed in a removable plug 26, which closes the upper end of the valve chamber, and provides easy access to the valve and to the interior of the chamber. The valve chamber 18 has a laterally projecting nipple 27, which is adapted to be connected by a suitable union 28 to the pipe which leads from the steam main, and the valve 20, when opened, is adapted to admit pressure to the interior of the trap. The valve 21 controls communication between the trap and an exhaust chamber 29, which is substantially at atmospheric pressure, and is provided with a laterally extending nipple 30, which may be connected by a suitable union 31 to a pipe leading to the return pipe line.

Located within the receiver 10 is a float 32, preferably oblong in shape, and having an internally threaded sleeve 33 formed at each end. The lower sleeve 33 has a guide pin 34 secured thereto, which has a head 35 in the form of a cross, so that it may be guided within the collar 11 without offering any material obstruction to the flow of the water therethrough. The sleeve 33 at the upper end of the float has a curved arm 36 secured thereto, the upper end of the arm being pivoted to a pin 37, which is secured to the weight 38 mounted within the dome 13. The weight 38 is substantially in the form of a sector, and is integrally, or otherwise, secured to a sleeve 39 having plugs 40 in its ends, which are rotatably supported by means of a spindle 41 mounted in ears 42 formed on the dome 13, and depending within the upper end of the receiver. The weight 38 has a pair of pins 43 and 44 secured therein, and adapted, as the weight swings back and forth, to engage opposite faces of a tappet arm 45 which extends downwardly between them. The arm 45 is supported on a pivot stud 46 secured in an arm 47, which is formed on the valve cage, and projects downwardly within the dome. Lugs 48, formed on the end of the arm 47, limit the movement of the tappet arm 45 about the stud 46 in either direction. Lugs 49 project in opposite directions from the tappet arm 45, and are adapted to engage the lower ends of the respective valve stems 22 to raise one or the other of the valves 20 and 21, according to the direction in which the tappet arm is swung. A spring plate 50 is secured to the face of the tappet arm 45 by a pin 51, and frictionally engages the head of the pivot stud 46 with sufficient force to hold the tappet arm in the position to which it has been moved by the pin 43 or 44, until the tappet arm is engaged by the other pin to swing it in the opposite direction.

In order that the operation of the trap may be clearly understood, I have illustrated in Figure 9 a portion of the heating system in which it is installed. This system comprises a boiler 52 having a steam main 53 leading from the top thereof, and having a branch pipe connection 54 with the valve chamber 18 leading to the trap 10. Water of condensation is returned to the bottom of the boiler through a pipe 55, and a steam main drip line 56 is connected therewith. An air line return 57 leads back through check valves 58 and 59 to the pipe section 55 which is connected to the boiler. This air line return 57 is provided with an air vent 60, and has a branch pipe 61 connected with the valve chamber 19. The pipe 12, leading from the bottom of the trap 10, is connected to the return pipe line between the check valves 58 and 59.

When the receiver 10 is empty, and until it has been nearly filled, the float 32 is in its lower position with the weight 38 swung toward the side to which the curved arm 36 is connected. In this position, the pin 43 engages the tappet arm 45, the valve 21 is open, and the valve 20 is closed. The pressure within the receiver is then the same as the pressure within the return pipe line, the valve 59 is held closed by the pressure from the boiler, and the water of condensation, as it is formed, flows into the receiver. This continues until the level of the water within the receiver has risen sufficiently to lift the float 32 and the weight 38, and to swing the latter toward the position shown in Figures 1 and 4. This reverses the position of the tappet arm 45, and opens the valve 20, while the valve 21 closes. Thus, the receiver is placed in communication with the steam pressure in the boiler. This pressure closes the valve 58, and since the receiver is somewhat higher than the water level in the boiler, as indicated by the line a, the water within the receiver will be returned through the pipe 12 and the valve 59 to the boiler.

When the water in the receiver has been lowered sufficiently, the downward pull, resulting from the unsupported weight of the float, will overbalance the tilting weight 38, and swing the same to the right from the position shown in Figure 1, again permitting the valve 20 to close, and opening the valve 21. Thus atmospheric pressure will be restored in the receiver 10, the valve 59 will be closed, and the valve 58 will be permitted to open and again allow water of condensation to flow into the receiver.

It will be noted that in each limiting position of the weight 38, its center of gravity is considerably to one side of the spindle 41 which forms its axis. When the force exerted by the float, either upwardly or downwardly, as the case may be, is sufficient to move the weight 38 past its center of gravity, the weight will then fall abruptly to its opposite position, which is determined by the engagement of the pin 43 or 44 with the tappet arm 45, and the movement of the latter to its opposite position. The shifting of the valves 20 and 21 occurs at the end of the movement of the tilting weight, and the positiveness of their action is insured not only by the weight of the member 38 but also by the momentum with which it strikes a hammer blow on the arm 45, thus increasing the shifting power far beyond the mere weight of the member 38.

The spring plate 50 holds the tappet arm 45 in the position to which it has been moved, thus insuring the positive operation, and simultaneous shifting of the valves toward the conclusion of the movement of the tilting weight, instead of operating during the first part of this movement as might otherwise occur. In traps as heretofore constructed, where no such frictional resistance is provided, the weight often makes a false start, and causes the valves to open or close before the final movement of the weight, or other shifting mechanism, is completed, thereby stopping the operation of the trap prematurely.

The specific shape of the tilting weight and the manner in which it is mounted also tend to simplify its operation, and make it more positive. It is also to be noted that the weight and the float are easily accessible by removing the dome. The valve cage and the tappet arm may be easily removed by unscrewing the bolts 17.

The arrangement of the valve chambers and valves 20 and 21 makes it possible to remove the valves merely by unscrewing the plugs 26. The valves are duplicates, and, therefore, interchangeable, thus simplifying the construction.

The float also is simple in construction, and the connections at its upper and lower ends insure a smooth and free operation. The entire mechanism of the trap is simple and positive in its operation and durable in its construction.

While I have shown and described in detail one embodiment of the invention, it is apparent that many modifications may be made in the structural details thereof, and in the size, shape and arrangement of the various parts thereof without any material departure from the essential features of the invention. It is my purpose, therefore, to include all such modifications within the scope of the appended claims.

What is claimed is:

1. In a trap of the character described, the combination of a receiver, a weight pivotally mounted within the receiver so as to swing back and forth above its pivot, a float for controlling the movement of the weight, two passageways connected to the upper end of the receiver, a reciprocating plunger valve for each passageway, a depending pivoted tappet adjacent said weight, projections on said weight at opposite sides of said tappet to engage and swing the tappet only after said weight has passed beyond dead center position, means operable by said tappet in swinging to open one valve and permit the other to close, and frictional means holding the tappet to sustain either valve in open position until the weight is positively shifted to open the other valve.

2. In a trap of the character described, the combination of a receiver having two passageways connected with its upper end, a valve chamber and valve for each passageway, said valves having stems guided for vertical reciprocation and being adapted to seat by gravity, a pivotally mounted depending tappet arm having lugs projecting underneath the respective stems, either of said lugs being engageable with the corresponding valve stem to raise the valve from its seat while the stem of the other valve is released to permit it to close, a weight pivoted within the receiver, a float connected to the weight for swinging it about its pivot, spaced pins projecting from said weight on opposite sides of the tappet arm and adapted to strike the same and swing it to actuate the respective valves, and spring means frictionally resisting the movement of said tappet arm.

3. In a trap of the character described, the combination of a receiver having two passageways connected with its upper end, valves controlling communication through said passageways and normally closed by gravity, a depending pivoted tappet arm having oppositely disposed lugs operable to open one valve or the other as the tappet arm is swung to and fro, a weight pivotally mounted beneath the tappet arm to swing back and forth above its pivot, spaced pins projecting from said weight on opposite sides of the tappet arm and adapted to strike the same and swing it to actuate the respective valves, and a float connected to the weight at one side of its pivot for controlling its movement.

In testimony, that I claim the foregoing as my own, I have hereto affixed my signature.

EDGAR C. WILEY.